United States Patent
Yu et al.

(10) Patent No.: US 9,843,265 B2
(45) Date of Patent: Dec. 12, 2017

(54) ZERO VOLTAGE SWITCHING FLYBACK CONVERTER

(71) Applicant: Dell Products L.P., Round Rock, TX (US)

(72) Inventors: Wei Cheng Yu, New Taipei (TW); Tsung-Cheng Liao, Taoyuan (TW); Wen-Yung Chang, Jhong Li (TW); Merle Jackson Wood, III, Round Rock, TX (US); Tun-Chieh Liang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 60 days.

(21) Appl. No.: 14/973,456

(22) Filed: Dec. 17, 2015

(65) Prior Publication Data
US 2017/0179831 A1    Jun. 22, 2017

(51) Int. Cl.
*H02M 3/335*    (2006.01)
*H02M 1/00*    (2006.01)

(52) U.S. Cl.
CPC .............. *H02M 3/33569* (2013.01); *H02M 2001/0022* (2013.01)

(58) Field of Classification Search
CPC .................. H02M 3/335; H02M 3/33569
USPC ..... 363/21.01–21.06, 21.09–21.12; 323/235, 323/266, 382–289, 315
See application file for complete search history.

(56) References Cited

U.S. PATENT DOCUMENTS

| | | | |
|---|---|---|---|
| 2002/0000795 A1 | 1/2002 | Wittenbreder, Jr. | |
| 2004/0062061 A1* | 4/2004 | Bourdillon ........ | H02M 3/33584 363/21.12 |
| 2005/0000795 A1* | 1/2005 | Takizawa ............. | G11B 5/7325 204/192.1 |
| 2010/0067259 A1* | 3/2010 | Liu .................... | H02M 3/33569 363/21.01 |
| 2011/0235371 A1* | 9/2011 | Liang ................ | H02M 3/33523 363/21.12 |
| 2011/0305043 A1* | 12/2011 | Matsumoto ....... | H02M 3/33592 363/21.01 |
| 2013/0148385 A1* | 6/2013 | Zhang ............... | H02M 3/33592 363/21.12 |
| 2014/0070885 A1* | 3/2014 | Frium ..................... | H03F 3/217 330/251 |

(Continued)

*Primary Examiner* — Adolf Berhane
*Assistant Examiner* — Nusrat Quddus
(74) *Attorney, Agent, or Firm* — Jackson Walker L.L.P.

(57) ABSTRACT

A zero voltage switching method for a flyback converter featuring a transformer with first and second primary windings and corresponding turns ratios, N1 and N2, includes rectifying and filtering an AC signal to produce a primary DC voltage. A voltage level signal indicating whether the primary DC voltage falls within a particular voltage range is generated. The voltage level signal is used to select a particular primary winding from either the first primary winding or the second primary winding. A PWM controller corresponding to the particular primary winding is activated and an output of the particular PWM controller performs zero voltage switching of a gate terminal of the applicable main switching transistor. A duty cycle of the main switching transistor is maintained within a range of approximately 50% to approximately 60% in accordance with the turns ratio and the primary DC voltage to achieve a desired output voltage.

16 Claims, 6 Drawing Sheets

(56) References Cited

U.S. PATENT DOCUMENTS

2014/0362612 A1\* 12/2014 Shi .................... H02M 3/33523
363/21.16

\* cited by examiner

|  | LOW TURNS RATIO N=10 | | HIGH TURNS RATIO N=20 | |
| --- | --- | --- | --- | --- |
|  | DUTY CYCLE | RESULT | DUTY CYCLE | RESULT |
| VDC LO 90-130 (VAC) | 50% TO 60% | ZVS | 65% TO 75% | ZVS HIGH IDS |
|  | DUTY CYCLE | RESULT | DUTY CYCLE | RESULT |
| VDC HI 180-270 (VAC) | 30% TO 45% | NZVS | 50% TO 60% | ZVS |

ZERO VOLTAGE SWITCHING FLYBACK CONVERTER

TECHNICAL FIELD

Disclosed subject matter pertains to voltage converters and, more particularly, flyback converters for producing a DC voltage from an AC supply signal.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information.

Because information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

Information handling systems may be used substantially anywhere in the world where there is a source of power. Almost universally, information handling systems require DC power for operation. Because mains power supplies are generally AC power supplies, a voltage adapter is required to provide the information handling system with a DC input voltage converted from an AC mains signal.

In a quasi-resonant flyback converter, it is desirable to refrain from switching the transistor off until the switching transistor source-to-drain voltage (VDS) is 0 V or substantially close to zero. A universally compatible adapter, however, is also desirable. Unfortunately, conventional designs for flyback converters exhibit undesirable characteristics at either end of the AC input spectrum.

SUMMARY

In accordance with the teachings of the present disclosure, disadvantages and problems associated with employing a conventional flyback converter for use in conjunction with a wide range of potential input voltages may be reduced or eliminated.

In accordance with embodiments of the present disclosure, a variable input voltage converter includes a rectifier, such as a bridge diode rectifier, configured to rectify an AC supply signal received from an AC power source to generate a rectified signal. The voltage converter includes a bulk capacitor configured to filter the rectified signal to provide a primary DC voltage at a primary DC node and a transformer. The transformer includes a secondary winding and a first primary winding, having a first number of turns (N1), coupled to the primary DC node. A second primary winding of the transformer has a second number of turns (N2) and is also coupled to the primary DC node.

The converter may further include a first main switching transistor including output terminals coupled in series with the first primary winding and a second main switching transistor including output terminals coupled in series with the second primary winding. A PWM circuit of the converter may be configured to provide a first output control signal to a control terminal of the first main switching transistor; and provide a second output control signal to a control terminal of the second main switching transistor.

The converter may further include a voltage comparator, configured to generate a voltage level indicator in accordance with an amplitude of the primary DC voltage, and a selection switch configured to enable one of the output control signals in accordance with the voltage level indicator signal. The voltage comparator may include a Schmitt trigger including a first input coupled to the primary DC node and a second comparator input coupled to a reference voltage.

The PWM circuit may include a first PWM controller for the first main switching transistor and a second PWM controller for the second main switching transistor. The selection switch may be configured to switch a DC supply signal, e.g., a 5 V DC signal, to activate one, but not both, of the first PWM controller and the second PWM controller.

A voltage level indicator signal may indicate whether the primary DC voltage is in a high voltage range or in a low voltage range. In at least one embodiment, N1 is greater than N2 and the selection switch may switch the power supply signal to the first PWM controller when the magnitude signal indicates the primary DC voltage is in the high voltage range.

Embodiments may include a first peak limiting circuit coupled across the first primary winding and a second peak limiting circuit coupled across the second primary winding. The peak limiting circuit may include a Zener diode in series with a standard diode of opposing polarity. The peak limiting circuit permits reverse breakdown current to flow towards the primary DC node.

The converter may include a sense resistor connected between ground and a source node to which a source terminal of the first PWM controller and a source terminal of the second PWM controller are coupled.

In accordance with embodiments of the present disclosure, an information handling system may include a processor, a memory device coupled to the processor, an internal DC-to-DC converter configured to receive a DC input voltage from a voltage converter, and a flyback converter configured to provide the DC input voltage to the internal DC-to-DC converter.

The flyback converter may include a transformer having a first primary winding comprising a first number of turns and a second primary winding comprising a second number of turns. The flyback converter may further include a first main switching transistor including output terminals coupled in series with the first primary winding, a second main switching transistor including output terminals coupled in series with the second primary winding, and a PWM control circuit.

The PWM control circuit, whether implemented in one or multiple devices, may be configured with a first PWM controller to provide, when activated, zero voltage switching of a first output control signal provided to a control terminal of the first main switching transistor to control a duty cycle of the first main switching transistor in accordance with a desired output voltage and the primary DC voltage. The PWM control circuit may further include a second PWM controller to provide, when activated, zero voltage switching of a second output control signal provided to a control terminal of the second main switching transistor to control a duty cycle of the second main switching transistor in accordance with the desired output voltage and the primary DC voltage.

The flyback converter may further include a voltage comparator configured to generate a voltage level indicator signal in accordance with a voltage of the primary DC voltage and a primary winding selection switch configured to activate one of the output control signals in accordance with the voltage level indicator signal such that the flyback converter selects the primary winding with the turns ratio that is best able to achieve zero voltage switching at a desirable duty cycle and without negatively impacting operating current.

In accordance with embodiments of the present disclosure, a zero voltage switching method for a flyback converter featuring a transformer with first and second primary windings and corresponding turns ratios, N1 and N2, includes rectifying and filtering an AC signal to produce a primary DC voltage. A voltage level signal indicating whether the primary DC voltage falls within a particular voltage range is generated. The voltage level signal is used to select a particular primary winding from either the first primary winding or the second primary winding. A PWM controller corresponding to the particular primary winding is activated and an output of the particular PWM controller performs zero voltage switching of a gate terminal of the applicable main switching transistor. A duty cycle of the main switching transistor is maintained within a range of approximately 50% to approximately 60% in accordance with the turns ratio and the primary DC voltage to achieve a desired output voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. Unless indicated otherwise, all FIGUREs are in accordance with embodiments of the present disclosure.

FIG. 6 is a table conveying quadrants of behavior for high and low DC supply signals and for higher and lower values of the turns ratio N;

DETAILED DESCRIPTION

Preferred embodiments and their advantages are best understood by reference to FIGS. 1-9, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
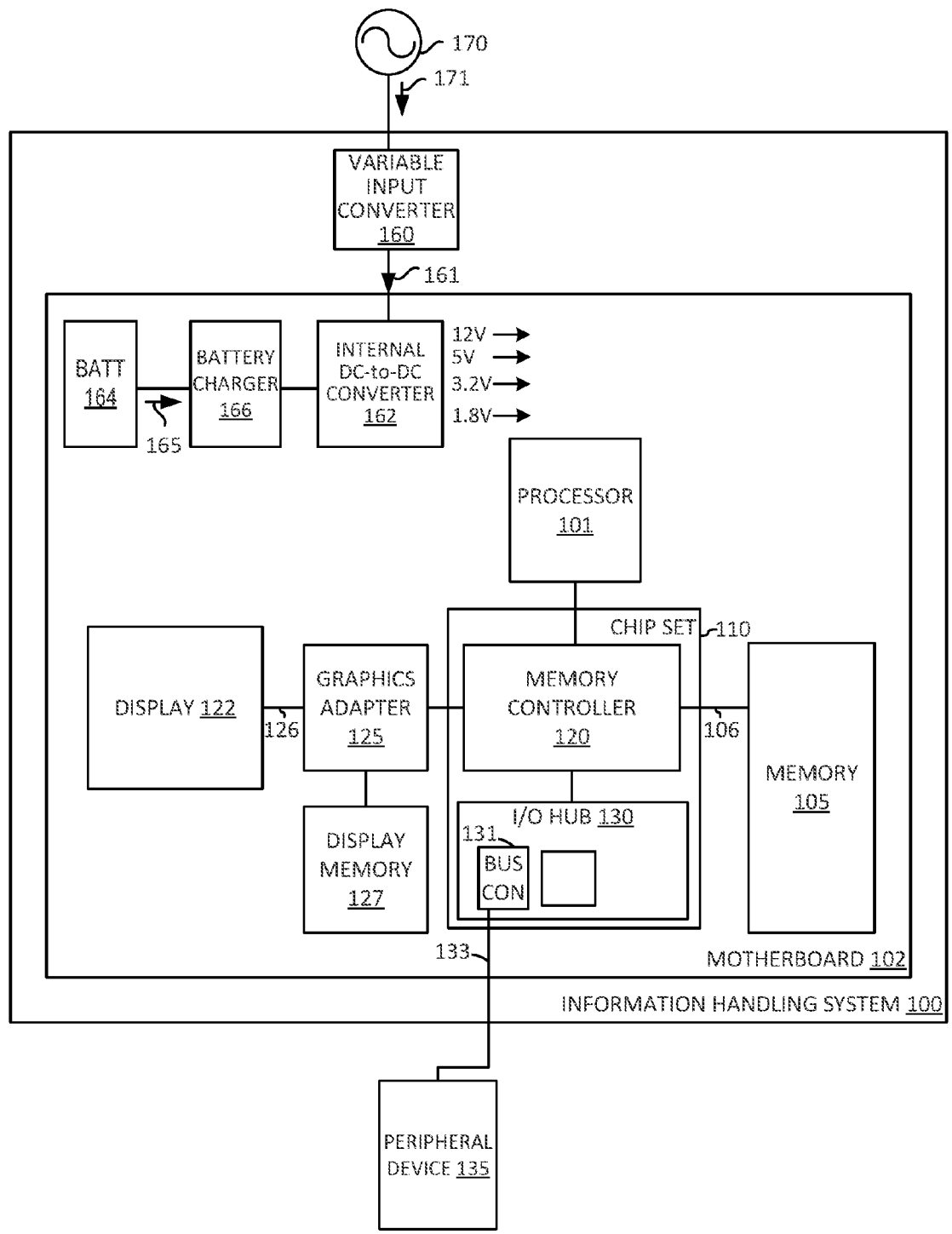
FIG. 1 illustrates a block diagram of an example information handling system.

FIG. 1 illustrates, in block diagram, an information handling system 100 that receives an AC supply signal 171 generated by an AC power source 170. As illustrated in FIG. 1, information handling system 100 includes a variable input converter 160 that receives the AC supply signal 171. In at least one embodiment, the variable input converter 160 is configured to produce a DC supply signal 161 that is provided to a motherboard 102 and other system components, devices, and interfaces not depicted in FIG. 1. As depicted in FIG. 1, DC supply signal 161 is provided to an internal DC-to-DC converter module 162 that produces various DC signals for use by different components of motherboard 102. The DC-to-DC converter module 162 of FIG. 1 is illustrated producing, by way of non-limiting example, 12 V, 5 V, 3.2 V, and 1.8 V DC supply signals, but converter 162 may generate more, fewer, or different supply signals than those illustrated. An example value of DC input voltage 161 is 20 V, but other embodiments may employ as non-limiting examples, a 5 V DC input signal, a 12 V DC input signal, a 3.7 V input signal, or any other one or more suitable values.

The internal DC-to-DC converter module 162 works in conjunction with a battery charger 164 coupled to a battery 166. When information handling system 100 is not receiving AC supply signal 171 from an AC power source 170, information handling system 100 may still be operational if battery 164 has sufficient stored charge to drive internal DC-to-DC module 162. Battery 164 generates a DC input signal, sometimes referred to as battery supply signal 165 of comparable magnitude with DC supply signal 161.

The information handling system 100 illustrated in FIG. 1 includes a processor 101 coupled to a memory controller 120, which is part of a chip set 110. Memory controller 120 is coupled to a memory 105 via a memory bus 106. Memory controller 120 is also coupled to a graphics adapter 125, which is coupled to a display 122 via a graphics bus 126, which may represent an AGP bus, a PCIexpress bus, or another bus suitable for providing a memory pipe to display 122. The graphics adapter 125 of FIG. 1 includes a dedicated display memory 127.

The memory controller 120 is illustrated in FIG. 1 coupled I/O hub 130, which is the second of two devices that constitute the chip set 110. In some instances, memory controller 120 may be referred to as a north bridge while I/O hub 130 may be referred to as a south bridge.

The I/O hub 130 of FIG. 1 includes a bus controller 131 that controls a peripheral bus 133 to which a peripheral device 135 is connected. Common examples of peripheral bus 133 include USB and other high speed serial interfaces, PCI and so forth. I/O hub 130 may provide and/or support a low bandwidth serial bus for communicating with human interfaces including a keyboard, mouse, touchpad, touch screen, and so forth. Many other examples of peripheral busses and peripheral devices that information handling system 100 may include are not disclosed expressly for the sake of brevity.

Depending upon where within the world information handling system 100 is connected to an AC power source 170, the amplitude of the AC power signal 171 may range from as little as 90 V AC to as high as 264 V AC. Selection and design of a variable input converter 160 to accommodate such a wide range of AC supply signals proves challenging in the context of a traditional quasi-resident (QR) flyback converter configuration. Specifically, as illustrated and described in more detail below, traditional flyback converters may be designed or optimized for a particular amplitude of AC supply signal 171 (e.g., 130 V AC) and, when this is the case, variable input converter 160 may perform poorly or inefficiently if a subsequent AC supply signal 171 provided to information handling system 170 exceeds, for example, 180 V or drops below, for example, 120 V.

Figure 2:
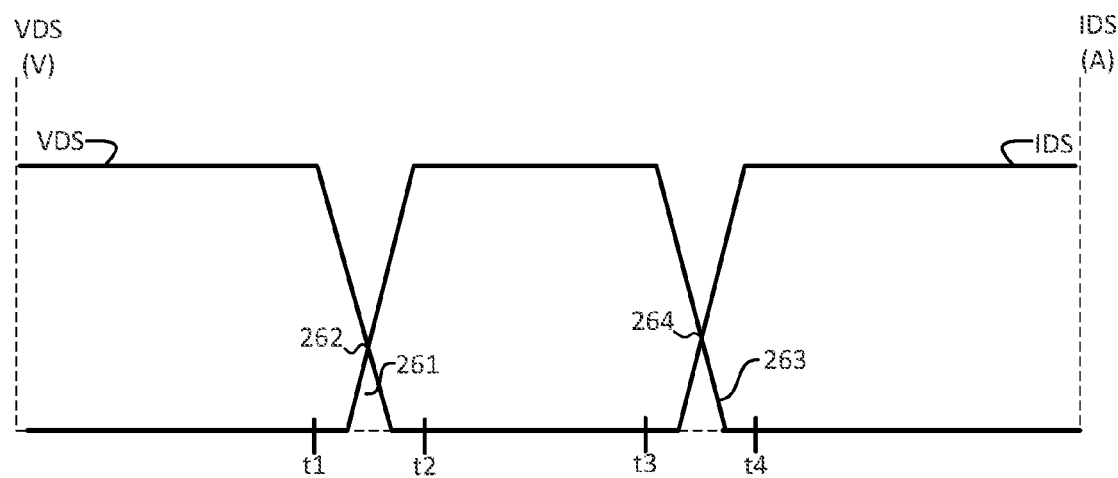
FIG. 2 illustrates graphically, switching loss associated with a transistor.

FIG. 2 introduces an issue that flyback converters disclosed herein address by illustrating switching losses, which represent a commonly encountered source of energy loss or energy inefficiency in switch mode converters including QR flyback converters. FIG. 2 plot main switching transistor VDS versus time overlaying a plot of main switching transistor IDS versus time for a conventional hard switched configuration. Switching losses are represented in FIG. 2 by the area 261 underlying the intersection 262 of the VDS plot and the IDS plot. The switching loss area 261 represents the integral of IDS(t)*VDS(t) from t=t1 to t=t2 while the switching loss area 263 represents the integral of IDS(t)*VDS(t) from t=t3 to t=t4. Switching loss areas 261 and 263 represent energy dissipated within the main switching transistor during on-off and off-on transitions. Switching loss area 261 illustrates energy loss during an off-to-on transition, when a declining VDS has not yet reached 0 V before IDS begins to flow. Conversely, switching loss area 263 illustrates energy loss during an on-to-off on transition, when a declining IDS has not yet reached 0 V before IDS begins to flow.

As graphically suggested by FIG. 2, reducing or eliminating switching losses 261 and 263 can be achieved by ensuring, in the case of loss region 261, that the main switching transistor VDS is 0 V or substantially 0 V at the time IDS begins to flow, i.e., at the time when the switching transistor gate terminal is asserted.

Figure 3:
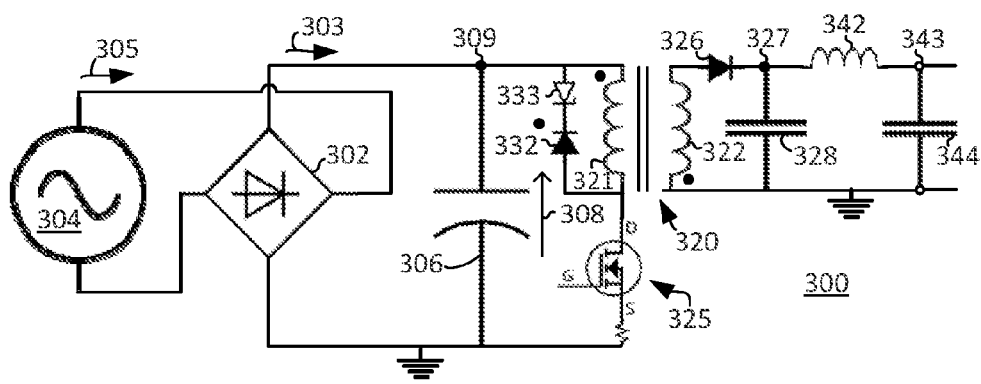
FIG. 3 illustrates selected elements of a conventional flyback converter.

FIG. 3 illustrates a flyback converter 300 that includes a rectifier 302 configured to receive an AC supply signal 305 from an AC voltage supply 304. Rectifier 302, which may include an electromagnetic interference (EMI) filter and a diode bridge rectifier, produces a rectified signal 303 that is filtered and stabilized by bulk capacitor 306 to produce primary DC signal 308 at primary DC node 309. Those of ordinary skill in the field of electronic circuits will recognize that primary DC signal 308 may include a combination of a true DC voltage and a small amplitude ripple voltage. The amplitude of the true DC voltage component of primary DC signal 308 is roughly equal to the amplitude of the AC supply signal 305 multiplied by $2^{(1/2)}$ or 1.414.

The flyback converter 300 illustrated in FIG. 3 further includes a transformer 320 that includes a primary winding 321 and a secondary winding 322. The primary winding 321 of transformer 320 is connected in series with the source-drain terminals D and S of a main switching transistor 325. A peak limiting circuit is connected across the two terminals of the primary DC node 309. The peak limiting circuit illustrated in FIG. 3 includes a standard diode 332 in series with a Zener diode 333 with the two diodes being connected at their cathodes. In this configuration, Zener diode 333 permits reverse breakdown current flow that limits the amplitude of voltage spikes at the drain terminal D of main switching transistor 325 occurring when the transistor is shut off, causing a rapid decline in the primary winding current.

An upper terminal of transformer secondary winding 322 is connected to the anode of rectifying diode 326, which couples secondary winding current to node 327, to which a reservoir capacitor 328 and a secondary inductor 342 are connected as illustrated. The illustrated secondary inductor 342 is connected between node 327 and output node 343, shown with a load capacitor 344 attached.

Figure 4:
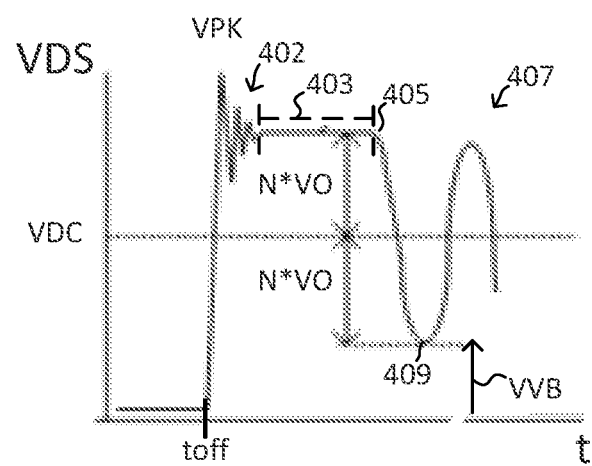
FIG. 4 illustrates VDS as a function of time for a switching transistor in a quasi-resonant flyback converter at a first DC input voltage (VDC) after the switching transistor is turned off.
Figure 5:
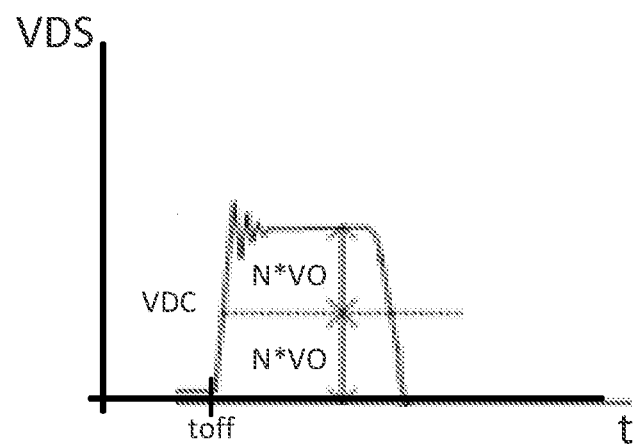
FIG. 5 illustrates the switching transistor VDS for the flyback converter of FIG. 4 for a second and lower value of VDC.

FIG. 4 and FIG. 5 illustrate respective plots of main switching transistor VDS versus time for the flyback converter of FIG. 2. The interval of time represented by the horizontal axis includes toff, which is the point in time that main switching transistor 325 is shut off, i.e., the point in time corresponding to a drop of the voltage of main switching transistor gate terminal G (FIG. 2) to a value below the threshold voltage.

As illustrated in FIG. 4, starting at toff, VDS begins rapidly transitioning from 0 or substantially 0 to a peak voltage, VPK, in accordance with a significant and steep decline in IDS (not depicted) when the main switching transistor is turned off. VDS then exhibits a decaying resonance behavior 402 before settling at a steady state value of approximately VDC+N*VO, wherein VDC is the average voltage of primary DC node 309 (FIG. 3), N is the turns ratio of transformer 320 (FIG. 3), and VO is the output voltage of flyback converter 300 (FIG. 3) throughout a discharge interval 403 during which energy stored in the secondary winding core is discharged into the load and/or secondary capacitor.

When the secondary winding core is fully discharged, VDS buckles at "knee point" 405 and begins a second, lower frequency oscillation 407, tracing a path sometimes described as a valley. In a QR flyback converter, a pulse width controller module (not depicted) detects the valley bottom 409 and turns on the main switching transistor. For this reason, a QR flyback converter may be referred to as a valley switching flyback converter.

FIG. 4 illustrates that the value of VDS at the valley bottom 409 is a function of three parameters, VDC, N, and VO and, more specifically, the valley bottom voltage (VVB) is approximately equal to VDC−N*VO. While one could design flyback converter 300 to achieve a particular desired value for VVB, doing so is more challenging when one of the parameters, VDC, is dependent on an input voltage that may have an amplitude anywhere in the range between 90 and 250 VAC. For example, while FIG. 4 represents a high input voltage embodiment in which VDC exceeds N*VO, i.e., an embodiment in which VVB greater than 0, FIG. 5 plots VDS versus time for a lower value of VDC. In the FIG. 5 plot of VDS, VDC is equal or approximately equal to N*VO and VVB drops to 0. Thus, FIG. 4 and FIG. 5 graphically illustrate that the objective of ensuring a switching transistor has a VDS of approximately 0 V whenever the switching transistor is turned on is achieved when VDC=N*VO.

To avoid the switching losses illustrated in FIG. 2 without prior information regarding a specific input voltage, it may be necessary to design the flyback converter to meet a particular VVB criteria across a range of input voltages. If the flyback converter 300 is used in conjunction with the information handling system 100 (FIG. 1) or in conjunction with any electronic device that specifies a particular value of supply voltage, the flyback converter's output voltage may be constrained to a single value, leaving the transformer turns ratio, N, as the most evident external parameter with which to control VVB and reduce switching losses. Assuming that it is infeasible to provide a unique primary winding, each with its own characteristic N, for more than two or three values of input voltage, providing at least two turns ratio alternatives may be sufficient based upon the constraints imposed on the pulse with modulation controller. If the duty cycle selected by the pulse width modulation controller for a given configuration falls within an acceptable range, zero voltage switching may be achieved for a wide range of input voltages using only an acceptably small number of turns ratio alternatives.

FIG. 6 illustrates a table 600 summarizing the zero voltage switching (ZVS) characteristics of a flyback converter configured with two primary windings alternatives and a pulse width modulation controller such as the flyback converter illustrated in FIG. 7 below. Table 600 divides the ZVS domain space into four quadrants, using input voltage VDC as one parameter and the transformer turns ratio (N) as a second parameter.

FIG. 6 reveals that having two turns ratio alternatives may be sufficient to achieve ZVS without incurring an undesirable increase in IDS consumption over a range of input voltages that spans substantially all publically implemented values of mains supply voltages. Assuming an output voltage of approximately 20 V, a turns ratio of approximately 9 achieves ZVS operation for input voltages between 90 and 130 VAC, having duty cycles between 50% and 60% while using a turns ratio of approximately 18 results in ZVS operation for input voltages between 180 and 270 VAC and duty cycles between 50% and 60%. Using the high turns ratio with an input voltage that falls within the low range may produce ZVS operation, but may also result in higher than desirable IDS current in accordance with a duty cycle between 65% and 75%. Using the lower turns ratio option for higher voltages may result in non-zero voltage switching (NZVS), i.e., may fail to achieve ZVS operation, in accordance with a duty cycle between 30% and 45%.

Figure 7:
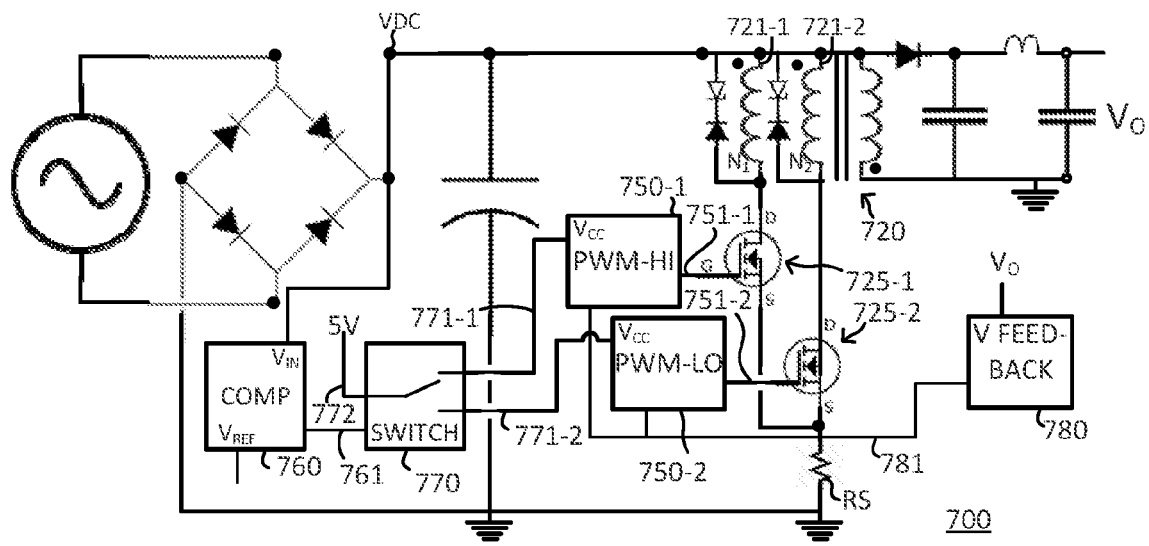
FIG. 7 illustrates selected elements of a flyback converter that supports zero voltage switching across a full range of AC input signals.

FIG. 7 illustrates elements of an exemplary flyback converter 700 suitable for ZVS operation across an input voltage range from 90 to 270 VAC. For the sake of clarity and brevity, FIG. 7 will be described with emphasis on elements that differ from analogous elements of the flyback converter 300 of FIG. 3. The flyback converter 700 of FIG. 7 includes a transformer 720 featuring two distinct primary windings, first primary winding 721-1 and second primary winding 721-2, as well as two distinct pulse width modulation controllers 750-1 and 750-2, two switching transistors 725-1 and 725-2, a high voltage DC comparator 760, a single pole double throw switch referred to herein as primary winding selection switch 770, and a voltage feedback module 780. Flyback converter 700 may include a current sensing resistor RS, coupled between ground and the source terminals, S, of each main switching transistor 725. Current sensing resistor RS may enable or facilitate the measurement of IDS current, e.g., by sensing a voltage of the source terminal node. The resistance of current sensing resistor RS may be sufficiently small such that it can be effectively ignored for purposes of evaluating the functionality of converter 700.

In at least one embodiment, first primary winding 721-1 has a turns ratio of N1 and second primary winding 721-2 has a turns ratio of N2, where N1 and N2 are different. In at least one embodiment, the primary-side DC voltage VDC provides an input to high voltage DC comparator 760, which generates a selection signal 761 indicative of VDC or a VDC level, e.g., a voltage range within which VDC falls. In some embodiments, voltage comparator 760 defines or otherwise recognizes a finite number of voltage ranges corresponding to the number of distinct primary windings 721 that transformer 720 is provisioned with. Because the transformer 720 illustrated in FIG. 7, as an example, is provisioned with two primary windings, high voltage DC comparator 760 may define or otherwise recognize two voltage ranges and selection signal 761 may indicate which of the two voltage ranges VDC falls within. In this manner, VDC, which is indicative of the amplitude of the mains supply voltage, determines which of multiple different turns ratio alternatives will be employed to best reduce the valley bottom voltage VVB and thereby best control switching losses of the type represented in FIG. 2.

Accordingly, the selection signal 761 is provided to primary winding selection switch 770, which selects which of two PWM VCC inputs, VCC input 771-1 or VCC input 771-2, to connect to a 5V supply signal 772 thereby effectively selecting which of the two PWM controllers, PWM-1 750-1 or PWM-2 750-2, to activate. Selection of PWM-1 750-1 will activate first PWM output control signal 751-1, first main switching transistor 725-1, and the first primary winding 721-1 of transformer 720 while selection of PWM-2 750-2 will activate second PWM output control signal 751-2, second main switching transistor 725-2, and the second primary winding 721-2 of transformer 720.

Both of the PWM controllers 750 illustrated in FIG. 7 receive a feedback signal 781 indicative of the output voltage, VO, from a feedback signal module 780 that isolates the feedback signal from the converter output. The PWM controllers 750 may support PWM features provided by any of a number of commercially distributed or captive-market PWM controllers including, as non-limiting examples, the NCP1207 family of PWM controllers from ON Semiconductor, the LM25037 family of PWM controllers from Texas Instruments, and the L6591 family of PWM controllers from ST Microelectronics. In one embodiment suitable for implementing quasi resonant charging, the PWM controllers 750 may receive a signal, e.g., from an auxiliary winding (not depicted in FIG. 7), that enables the PWM controller to identify the presence of a VDS valley bottom, such as the VDS valley bottom 409 illustrated in FIG. 4, to support quasi resonant activation of the applicable main switching transistor 725.

The high-voltage DC comparator 760 illustrated in FIG. 7 receives the high voltage DC signal, VDC, and generates a selection signal 761 based on VDC. In at least one embodiment in which the flyback converter 700 includes two primary windings including a lower-N winding having fewer winding turns and a higher-N winding having more winding turns, the selection signal 761 generated by high voltage DC comparator 760 may indicate which of two voltage ranges, a lower voltage range and a higher voltage range, VDC falls within. The primary winding selection switch 770 translates the comparator's indication of a voltage range into an indication of the most appropriate primary winding, i.e., the primary winding the most appropriate turns ratio to accommodate ZVS operation with an acceptable duty cycle and IDS value.

Although FIG. 7 illustrates two distinct PWM controllers 750, embodiments may include an integrated PWM device that supports multiple primary windings and multiple corresponding main switching transistors. Similarly, the high voltage DC comparator 760 and the primary winding selection switch 770, although depicted separately, may be integrated within a single integrated circuit or logic block. In addition, although the FIGURES illustrate two primary windings and corresponding PWM controllers and switching transistors, other embodiments may support more than two primary windings.

Figure 8:
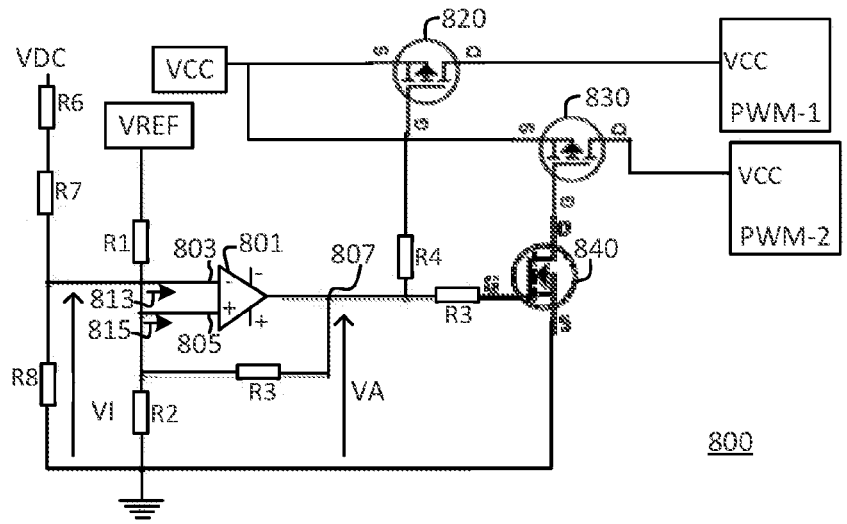
FIG. 8 illustrates a voltage comparator suitable for use in the flyback converter of FIG. 7.

FIG. 8 illustrates example compare and select circuitry 800 suitable for providing an implementation of the voltage comparator 760 as well as the primary winding selection switch 770. The compare and select circuit illustrated in FIG. 8 includes a Schmitt comparator 801 that includes a negative input terminal 803 and a positive input terminal 805. As illustrated in FIG. 8, the negative input terminal 803 of Schmitt comparator 801 receives a VDC signal 813 that is derived from VDC. In the compare and select circuitry 800 illustrated in FIG. 8, VDC signal 813 is derived from VDC with a resistive voltage divider circuit that includes transistors R6, R7, and R8 in series between VDC and ground, in which case, VI, the voltage of VDC signal 813 at negative input terminal 803, equals or substantially equals VDC*(R8/(R6+R7+R8)).

Because the Schmitt comparator 801 operates analogous to an operational amplifier, the differential voltage between negative input terminal 803 and positive input terminal 805 is negligible and the positive input terminal 805 stabilizes at VI, the voltage on negative input terminal 803. The voltage, VA, at the comparator output node 807 can be expressed in terms of VREF and VDC and adjusted via any one or more of R1, R2, R3, R6, R7, and R8.

The comparator output node 807 drives two transistor switches having opposite polarity such that when one of the switches is closed, the other is open. In the compare and select circuitry 800 illustrated in FIG. 8, the comparator output node 807 drives a gate terminal G of PMOS transistor 820 via resistor R4 and a gate terminal G of PMOS transistor 830 via R5 and a polarity-inverting NMOS transistor 840. When VA is logically low, PMOS transistor 820 turns on and connects VCC to a VCC input of PWM-1, thereby activating PWM-1. A logically low value of VA also turns off NMOS transistor 840, which floats the gate terminal G of PMOS transistor 830 and cuts off the transistor, isolating VCC from PWM-2. Conversely, when VA is logically high, PMOS transistor 830 cuts off, isolating VCC from PWM-1 while NMOS transistor 840 turns on and pulls the G terminal of PMOS transistor 830 to ground (logical low), thereby turning on the transistor and coupling VCC to a VCC input of PWM-2.

Figure 9:
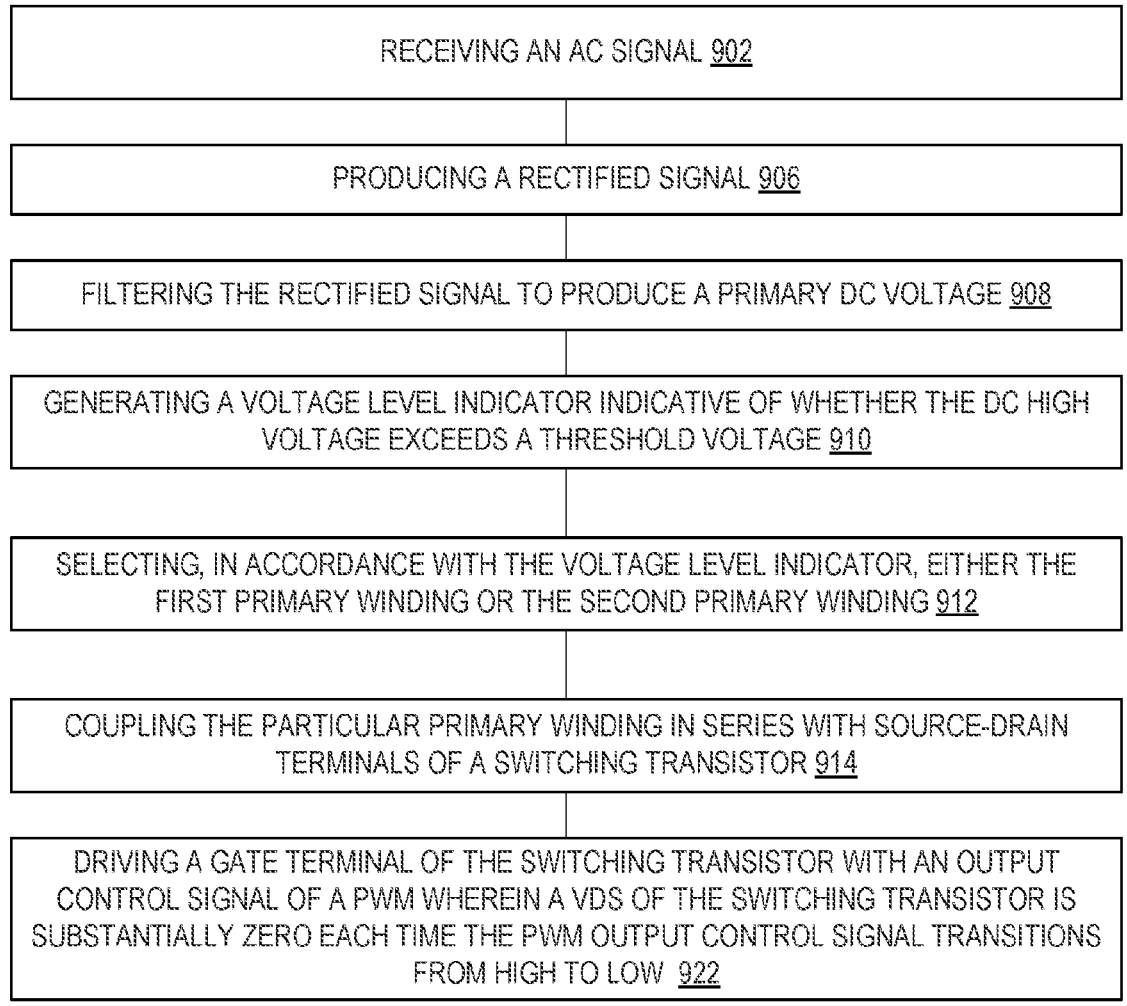
FIG. 9 is a flow diagram of a method of converting an AC input signal to a DC output using a flyback converter that employs multiple primary windings and corresponding main switching transistors to achieve zero voltage switching.

FIG. 9 illustrates a method 900 of operating a flyback converter in a zero voltage switching configuration over a wide range of AC input signals. The method 900 illustrated in FIG. 9 may include operations performed by the flyback converter 700 illustrated in FIG. 7. Method 900 may include receiving (operation 902), by a flyback converter, an AC signal. The flyback converter may include a transformer with first and second primary windings having corresponding first and second turns ratios, N1 and N2. N1 and N2 may differ from one another where the N1 turns ratio is applicable to configurations in which the AC input voltage falls within a first voltage range, e.g., a high voltage range, and the N2 turns ratio is applicable to configurations in which the AC input voltage falls within a second voltage range, e.g., a low voltage range.

The illustrated embodiment of method 900 includes rectifying (operation 906) and filtering (operation 908) the AC signal to produce a primary DC voltage. A voltage level indicator may then generate (operation 910) a signal indicative of whether the primary DC voltage exceeds a particular threshold or falls within a particular voltage range.

The voltage level indicator may be provided to a switch circuit for selecting (operation 912), in accordance with the voltage level indicator, either the first primary winding or the second primary winding. The selection of the applicable primary winding may include selecting the primary winding with the turns ratio corresponding to the voltage level indicated. For voltage level indicators indicating the high voltage range, the primary winding with the larger turns ratio may be selected. Conversely, the primary winding with the lower turns ratio may be selected when the voltage level indicator indicates a low voltage range.

Once the primary winding is selected, method 900 may include coupling (operation 914) the particular primary winding in series with source-drain terminals of a switching transistor driving (operation 922), by an output of the selected pulse width modulation controller, a gate terminal of the applicable main switching transistor, i.e., the main switching transistor associated with the selected primary winding. As described herein, the gate terminal of the selected switching transistor is controlled in a manner such that wherein the switching transistor's VDS is substantially 0 V each time the PWM's output control signal transitions to turn the switching transistor off.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A flyback converter comprising:
   a rectifier configured to rectify an AC supply signal received from an AC power source to generate a rectified signal;
   a bulk capacitor configured to filter the rectified signal to provide a primary DC voltage at a primary DC node;
   a transformer including:
      a first primary winding, comprising a first number of turns, coupled to the primary DC node;
      a second primary winding, comprising a second number of turns, coupled to the primary DC node; and
      a secondary winding;
   a first main switching transistor including output terminals coupled in series with the first primary winding;
   a second main switching transistor including output terminals coupled in series with the second primary winding;
   a PWM circuit configured to:
      provide a first output control signal to a control terminal of the first main switching transistor; and
      provide a second output control signal to a control terminal of the second main switching transistor;
   a voltage comparator configured to generate a voltage level indicator signal in accordance with a voltage of the primary DC voltage; and
   a selection switch configured to enable one of the output control signals in accordance with the voltage level indicator signal;
   a first peak limiting circuit coupled across the first primary winding; and
   a second peak limiting circuit coupled across the second primary winding.

2. The flyback converter of claim 1, wherein the rectifier comprises a bridge diode rectifier.

3. The flyback converter of claim 1, wherein the first peak limiting circuit includes a Zener diode in series with a standard diode of opposing polarity.

4. The flyback converter of claim 1, wherein the first peak limiting circuit permits reverse breakdown current to flow towards the primary DC node.

5. The flyback converter of claim 1, wherein the voltage comparator includes a Schmitt trigger including a first input coupled to the primary DC node and a second comparator input coupled to a reference voltage.

6. A flyback converter comprising:
   a rectifier configured to rectify an AC supply signal received from an AC power source to generate a rectified signal;
   a bulk capacitor configured to filter the rectified signal to provide a primary DC voltage at a primary DC node;
   a transformer including:
      a first primary winding, comprising a first number of turns, coupled to the primary DC node;
      a second primary winding, comprising a second number of turns, coupled to the primary DC node; and
      a secondary winding;
   a first main switching transistor including output terminals coupled in series with the first primary winding;
   a second main switching transistor including output terminals coupled in series with the second primary winding;
   a PWM circuit configured to:
      provide a first output control signal to a control terminal of the first main switching transistor; and
      provide a second output control signal to a control terminal of the second main switching transistor;
   a voltage comparator configured to generate a voltage level indicator signal in accordance with a voltage of the primary DC voltage; and
   a selection switch configured to enable one of the output control signals in accordance with the voltage level indicator signal;
   wherein the PWM circuit includes a first PWM controller for the first main switching transistor and a second PWM controller for the second main switching transistor.

7. The flyback converter of claim 6, wherein the selection switch couples a power supply signal to either the first PWM controller or the second PWM controller.

8. The flyback converter of claim 7, wherein the voltage level indicator signal indicates whether the primary DC voltage is in a high voltage range or in a low voltage range.

9. The flyback converter of claim 8, wherein N1 is greater than N2 and wherein the selection switch switches the power supply signal to the first PWM controller when the voltage level indicator signal indicates the primary DC voltage is in the high voltage range.

10. The flyback converter of claim 1, further comprising a sense resistor connected between ground and a source node to which a source terminal of the first main switching transistor and a source terminal of the second main switching transistor are coupled.

11. An information handling system, comprising:
a processor;
a memory device coupled to the processor;
an internal DC-to-DC converter configured to receive a DC input voltage from a voltage converter; and
a flyback converter configured to provide the DC input voltage to the internal DC-to-DC converter, wherein the flyback converter includes:
rectifying circuitry configured to:
generate a primary DC voltage from an AC supply signal; and
provide the primary DC voltage to a primary DC node;
a transformer including:
a first primary winding, comprising a first number of turns, coupled to the primary DC node; and
a second primary winding, comprising a second number of turns, coupled to the primary DC node;
a first main switching transistor including output terminals coupled in series with the first primary winding;
a second main switching transistor including output terminals coupled in series with the second primary winding;
a PWM circuit configured to provide an output control signal to a control terminal of a particular main switching transistor, selected from the first main switching transistor and the second main switching transistor, to control a duty cycle of the particular main switching transistor in accordance with the primary DC voltage and the DC input voltage;
a voltage comparator configured to generate a voltage level indicator signal in accordance with the primary DC voltage; and
a selection switch configured to select the particular main switching transistor in accordance with the voltage level indicator signal;
wherein the PWM circuit includes a first PWM controller corresponding to the first main switching transistor and a second PWM controller corresponding to the second main switching transistor.

12. The information handling system of claim 11, wherein the rectifying circuitry includes:
a diode bridge rectifier configured to receive the AC supply signal and generate a rectified signal; and
a bulk capacitor configured to filter the rectified signal to provide the primary DC voltage at the primary DC node.

13. The information handling system of claim 11, wherein the voltage comparator includes a Schmitt trigger including a first input coupled to the primary DC node and a second input coupled to a reference voltage.

14. The information handling system of claim 11, wherein the selection switch couples a power supply signal to either the first PWM controller or the second PWM controller.

15. The information handling system of claim 11, wherein:
the first number of turns is greater than the second number of turns;
the voltage level indicator signal indicates whether the primary DC voltage is in a high voltage range or in a low voltage range; and
the selection switch selects:
the first main switching transistor as the particular switching transistor in accordance with the voltage level indicator indicating the primary DC voltage is in the high voltage range; and
the second main switching transistor as the particular switching transistor in accordance with the voltage level indicator indicating the primary DC voltage is in the low voltage range.

16. The information handling system of claim 11, further comprising a sense resistor connected between ground and a source node to which a source terminal of the first main switching transistor and a source terminal of the second main switching transistor are coupled.

* * * * *